US006003400A

United States Patent [19]
Rauchfuss

[11] Patent Number: 6,003,400
[45] Date of Patent: Dec. 21, 1999

[54] ROBOTIC WRIST MECHANISM

[75] Inventor: Jason W. Rauchfuss, 7913 La Fiesta Dr., Buena Park, Calif. 90620

[73] Assignees: Jason W. Rauchfuss, Buena Park, Calif.; Andrew M. Calderon, Reston, Va.

[21] Appl. No.: 09/079,813

[22] Filed: May 16, 1998

[51] Int. Cl.[6] .................................................. B25J 7/02
[52] U.S. Cl. ..................... 74/490.06; 414/917; 901/29
[58] Field of Search .................. 74/68, 490.06, 74/490.05; 901/28, 29; 414/917

[56]      References Cited

U.S. PATENT DOCUMENTS

| 567,155 | 9/1896 | McIntire .................................. 74/68 X |
|---|---|---|
| 4,551,058 | 11/1985 | Mosher . |
| 4,624,621 | 11/1986 | Murakami . |
| 4,821,594 | 4/1989 | Rosheim . |
| 5,192,179 | 3/1993 | Kovacs ................................. 414/917 X |
| 5,265,489 | 11/1993 | Tohnai et al. ....................... 414/917 X |
| 5,305,653 | 4/1994 | Ohtani . |
| 5,580,209 | 12/1996 | Ogawa . |

OTHER PUBLICATIONS

Robotic Adhesive Dispensing for Bonding and Sealing, Oct. 1984, R. Pilarski, Robotics Today, pp. 34–37.
Machinery Mechanisms, Oct. 1964, Various Authors, Engineering, vol. 35, No. 22, pp. 108–115.
Polyarticulated Mechanical Structure for Decoupling the Position and Orientation of a Robot, 1986, M. Fayet, et al., Romansy 6, Proceedings of the 6th CISM–IFtoMM Symposium on Theory and Practice of Robots and Manipulators, pp. 545–555.
Analysis of a Robot Wrist Device for Mechanical Decoupling of End Effector Position and Orientation, J.C. Guinot et al., 1986, Proceedings of the 6th CISM–IFtoMM Symposium on Theory and Practice of Robots and Manipulators.
Systematic Mechanism Design, May 1965, P. Jensen, ASME, pp. 2–15.
Analysis and Implementation of a 6 DOF Stewart Platform Based Robotic Wrist, 1990–1991, C. Nguyen, Computers Electr. Engineering, vol. 17, No. 3, pp. 191–203.
Et: A Wrist Mechanism Without Singular Positions, J. Trevelyan et al. 1985, International Journal of Robotics Research, No. 4., pp. 71–85.
Robotic Wrist Actuators, M. Rosheim, 1989, Wiley Publications, pp. 74–77, 260–261, 264.

*Primary Examiner*—Allan D. Herrmann
*Attorney, Agent, or Firm*—Andrew M. Calderon

[57]         ABSTRACT

A wrist mechanism for a robotic manipulator having kinematically zero length and mutually orthogonal unlimited joints is provided. The wrist mechanism provides access to any reachable point from any arbitrary direction. The wrist mechanism includes an intermediate joint created by two parallelogram four-bar linkages operating in parallel. Each of the four bar linkages include two side bars, a fixed bar and a coupler bar. The coupler bars extend to support a last link of the wrist mechanism which holds an end effector. The kinematic lengths of the side bars are less than the kinematic lengths of the fixed and coupler bars. The side bars of the first parallelogram four-bar linkage are fixed out of phase with respect to the side bars of the second parallelogram four-bar linkage. Also, the side bars of both parallelogram four-bar linkages occupy multiple planes which, along with the kinematic lengths of all the linkage bars, allows for unlimited rotation and zero dwell time.

35 Claims, 13 Drawing Sheets

ROBOTIC WRIST MECHANISM

BACKGROUND OF THE INVENTION

1. Field of the Invention

The invention relates generally to a wrist mechanism for a robotic manipulator. In particular, the invention relates to a wrist mechanism having kinematically zero length and mutually orthogonal unlimited joints thus enabling to access any reachable point from any arbitrary direction.

2. Description of the Related Art

The dexterity of a robotic manipulator has been defined as the ability of a manipulator to access a point in a workspace from different directions. This ability is a function of the link dimensions and the joint limits of the robotic manipulator.

In order for a robotic manipulator to access every point in the workspace from all directions, three criteria must be met, including (i) three wrist joints having unlimited rotatability, (ii) three wrist joint axes intersecting at a mutually orthogonal point, and (iii) a point of intersection of the wrist axes being located at the tip of an end effector. It is the latter criteria that appears most difficult to practically achieve using current systems.

Thus, current robotic manipulators are not capable of accessing every point in the workspace from all directions due to wrist link parameters that may be impractical to obtain using current designs.

The implementation of robotic manipulators and Computer Numerically Controlled (CNC) machines generally requires the end effector of the manipulator to follow a specified trajectory. This trajectory requires the end effector to visit various points in Cartesian space as well as to access these points from arbitrary directions. Accessing a point from an arbitrary direction requires the manipulator to have six degrees of freedom, three for position and three for orientation. This being the case, most manipulators are constructed with six axes. The axes of the manipulator are either revolute joints or prismatic joints.

Also, in robotic manipulators and CNC systems, the manipulator consists of a regional structure and a wrist structure. The regional structure consists of a first set of three links for global positioning and the wrist structure consists of a last set of three links for orientation. In these systems the regional structure is relatively large compared to the wrist structure.

With the trajectory specified, the joint values need to be calculated for each point along the trajectory. This is called the inverse kinematics problem. A closed form solution to the inverse kinematics problem is difficult, if not impossible, to find for a generalized manipulator. This is due to the highly non-linear nature of the equations used to describe the kinematics of the manipulator. If a closed form solution cannot be found, the inverse kinematics must be solved numerically and the time required for computing the inverse kinematics may prevent real time trajectory planning. In light of these obstacles, most manipulators have a "simple" design which allows for finding a closed form solution for the inverse kinematics thereby allowing for real time trajectory planning.

One feature of a simple design is to have the last three axes intersect at a point which is located at the center of the wrist, but not at the end effector. However, even with a simple design, not all the points in the manipulator's reachable workspace can be accessed from any arbitrary direction. This is typically due to the length of the last link of the manipulator.

The inverse kinematics becomes decoupled and more efficiently solved if the wrist structure is designed so that the center of the wrist is located at the end effector. Moreover, all reachable points can be accessed from any arbitrary direction if all of the wrist joints are unlimited. Kinematically, a wrist with such a design has zero dimension.

Some attempts have been made to design a zero dimension wrist. For example, Fayet and Jutard have designed a manipulator which consists of three bar linkages within the regional structure. In this design, the linkages within the regional structure allow the mount of the end effector to maintain a fixed orientation with respect to the base of the manipulator. Thus, as the regional structure is moved for global positioning, the orientation of the mount remains fixed. The orientation of the end effector is then achieved by varying the joints of the wrist.

Another approach has been suggested by Nguyen, et. al. which replaces the wrist structure with a Steward platform. Although these designs have advantages for solving the inverse kinematics problem, the wrists have limited ranges of motion and thus cannot access every reachable point from any arbitrary direction.

One method for overcoming the shortcomings of Fayet and Jutard, and Nguyen, is to replace the intermediate joint of a Euler angle wrist with a linkage. To this end, Guinot and Biduad have replaced the intermediate joint with a Peaucellier inversor mechanism.

Another design based on this concept was developed by Mosher and used by Pilarski and Trevelyan. The Mosher design consists of replacing the intermediate joint of a Euler angle wrist with two four-bar linkages in series. This design achieves the zero dimension, but has a very limited range of motion which introduces a dwell time when the angle of the intermediate wrist joint passes through the zero position.

FIG. 1 shows the Mosher design. As seen in FIG. 1, the wrist mechanism consists of two parallelogram four-bar linkages in series. The outermost link 6 rotates about a tool tip. This results in three axes of the linkage intersecting at the tool tip. However, this mechanism has a limited range of motion for the intermediate joint $\theta_5$, e.g., $0 \leq \theta_5 \geq 120°$. Also, this configuration creates a dwell time problem when the joints are rotated through the zero position. Particularly, the dwell time occurs when $\theta_4$ and $\theta_6$ axes are rotated 180°, while $\theta_5$ is held at 0°. This occurs before $\theta_5$ can continue in the negative range. As further seen in FIG. 1, all of the bars are contained in four planes of motion, namely, the fixed side bar 1 in a first plane, side bars 2 and 4 positioned on a second plane and side bars 3 and 5 positioned on a third plane, and a coupler bar 6 is positioned in a fourth plane. The design of Mosher (and others, e.g., Guinot and Biduad) have unlimited ranges of motions for the first and last joints, but have limited ranges of motion for the intermediate joint. This reduces the amount of movement of the wrist mechanism.

An improvement to these designs would include a wrist mechanism having an unlimited range of motion for the intermediate joint. Such a design would allow accessing any reachable point from any arbitrary direction and eliminating the dwell time problem. The inverse kinematics would also be solved more efficiently, thus allowing for real time trajectory planning.

SUMMARY OF THE INVENTION

According to a first aspect of the invention, an intermediate joint of the wrist is created by two parallelogram four-bar linkages operating in parallel. Each of the four bar linkages comprise two side bars, a fixed bar and a coupler bar. The coupler bars are preferably extended to support a last link of the wrist mechanism which holds an end effector.

In preferred embodiments, the lengths of the side bars are less than the lengths of the fixed bar and the coupler bar, and the side bars of the first parallelogram linkage are preferably out of phase with respect to the side bars of the second parallelogram four-bar linkage. Also, in embodiments, the side bars of both parallelogram four-bar linkages occupy multiple planes which, along with the lengths of all the linkage bars, allows for unlimited rotation. By using this configuration, the intermediate joint of the wrist mechanism also has an unlimited range of motion.

BRIEF DESCRIPTION OF THE DRAWINGS

Preferred embodiments will now be described in relation to the following figures.

DETAILED DESCRIPTION OF THE INVENTION

The detailed description of the invention is based on a wrist mechanism having kinematically zero length and mutually orthogonal unlimited joints. All numbers and dimensions used in this description are for illustrative purposes only Thus, dimensions of the wrist mechanism including joints, linkages and other dimensions and quantities specified herein may vary with the size and type of wrist mechanism contemplated for use with the invention. Therefore, numbers and dimensions specified herein are not to be construed as limitations on the scope of the invention, but are meant to be merely illustrative of one particular application.

According to an aspect of the invention, real time trajectory planning through efficient solution of manipulator inverse kinematics and access to any reachable points from arbitrary directions with the elimination of dwell time is achieved. This is achieved by having a wrist mechanism having kinematically zero length and three mutually orthogonal unlimited joints, as described in more detail below.

In preferred embodiments, the wrist mechanism includes three axes intersecting at a single point, preferably located at an end effector. The three axes of the wrist mechanism intersect at a single point by using a linkage system in place of an intermediate joint of a Euler angle wrist. This configuration decouples the position and orientation of the manipulator inverse kinematics. Also, an intermediate joint of the invention allows a last link of the wrist mechanism to rotate freely about a tool tip (e.g., the point where the three axes of the wrist intersect). The intermediate joint of the invention has an unlimited rotatability which is provided by using two four-bar parallelogram linkages, which in preferred embodiments, are identical. Accordingly, the invention solves the dwell time problem, i.e., zero dwell time allowing for continuous trajectory tracking without pausing when the intermediate joint passes through a zero position. In preferred embodiments, each four-bar parallelogram linkage comprises side bars, a fixed bar and a coupler bar. The side bars, the fixed bar and the coupler bars occupy multiple planes which allows unlimited rotation of the end effector.

Figure 1:
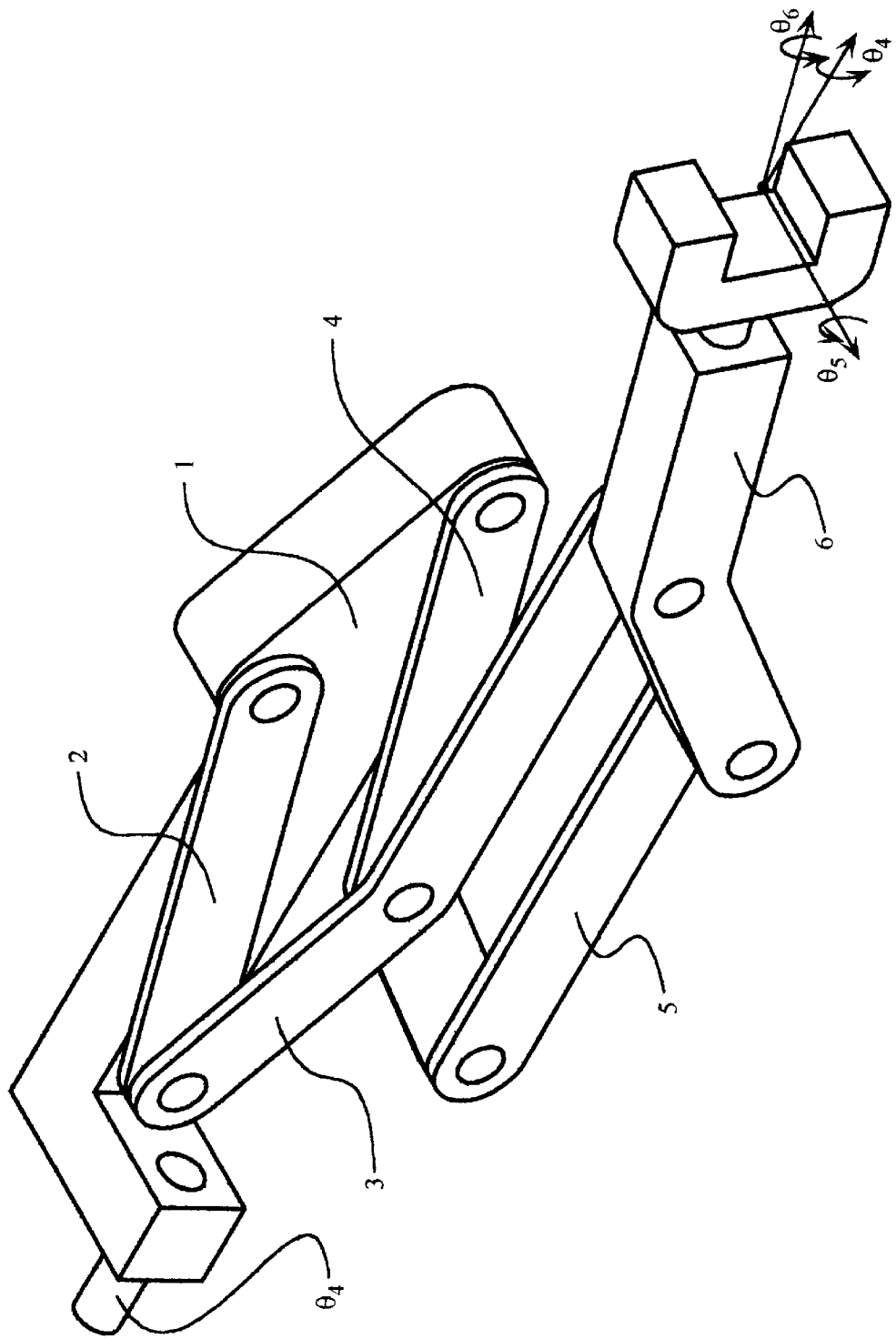
FIG. 1 shows a prior art system.
Figure 2A:
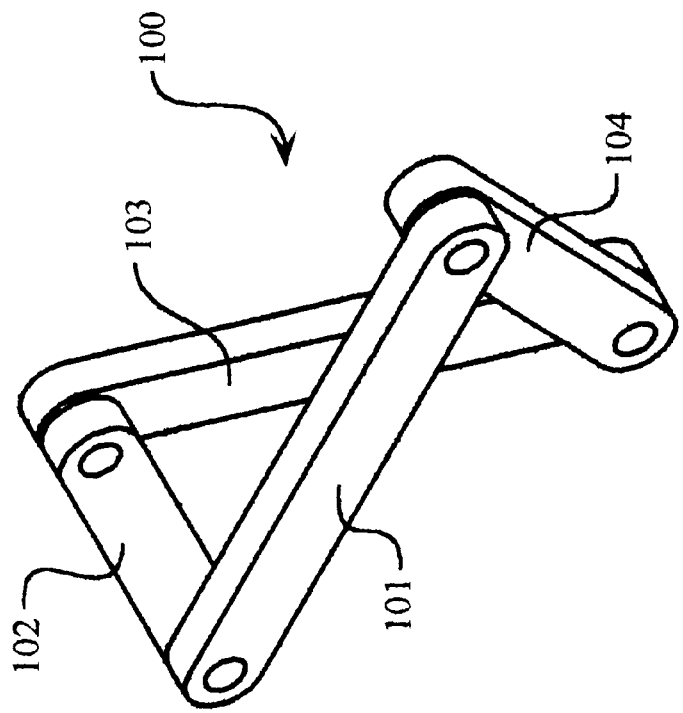
FIG. 2a shows an anti-parallelogram structure.
Figure 2:
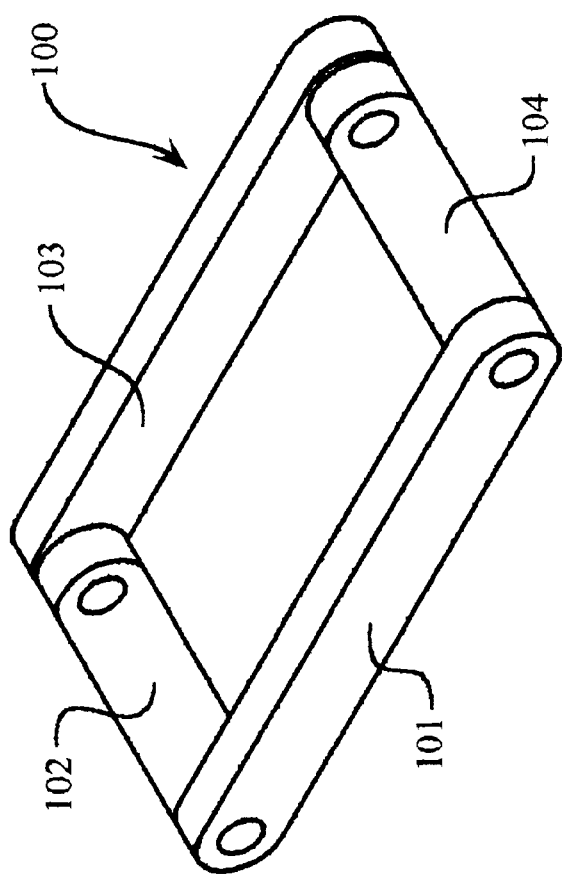
FIG. 2 shows a parallelogram four-bar linkage.

FIG. 2 shows a parallelogram four bar linkage 100. The four bar linkage 100 comprises a fixed bar 101, a coupler bar 103, and two side bars 102, 104. In preferred embodiments, the fixed bar 101 and coupler bar 103 have substantially equal lengths. The side bars 102, 104 also have substantially equal lengths. By using this configuration, the side bars 102, 104 are substantially parallel with respect to each other, and the fixed bar 101 and coupler bar 103 are also substantially parallel with respect to each other, regardless of the rotational position of the parallelogram four bar linkage 100. Thus, when the bars side 102 and 104 are rotated with respect to the fixed bar 101, the side bars 102, 104 remain in substantial parallel relation with respect to each other, and the fixed bar 101 and the coupler bar 103 also remain in substantially parallel relation with respect to each other. By using this configuration a change point of the side bars 102, 104, and the fixed bar 101 and coupler bar 103 may occur, resulting in an anti-parallel configuration of FIG. 2a, i.e., when the side bars 102, 104 rotate in opposite directions with respect to the fixed bar 101, while the fixed bar 101 and coupler bar 103 cross one another.

Figure 3:
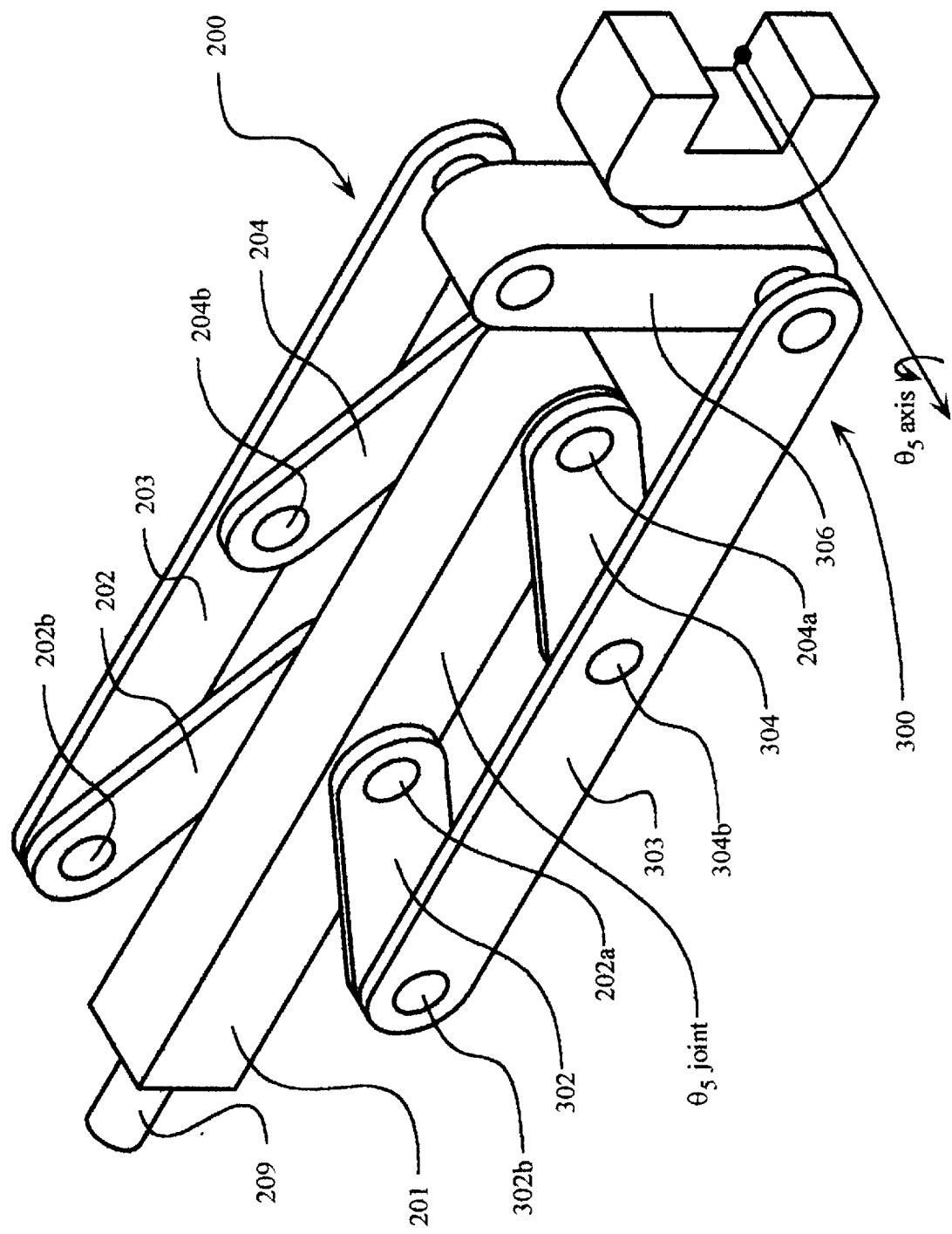
FIG. 3 shows an embodiment of a wrist mechanism of the invention.

FIG. 3 shows a wrist mechanism of the present invention using the linkage system of FIG. 2. In embodiments, the wrist mechanism includes an intermediate joint $\theta_5$ created by two parallelogram four-bar linkages 200, 300 operating in parallel. The four-bar linkage 200 comprises side bars 202, 204, a coupler bar 203 and a fixed bar 201. Similarly, the four bar linkage 300 comprises side bars 302, 304, a coupler bar 303 and the fixed bar 201. The side bars 202, 204 are located on one side of the fixed bar 201, while the side bars 302, 304 are located on the other side of the fixed bar 201.

As described in more detail below with reference to FIG. 8, in embodiments, the fixed bar 201, the coupler bars 203, 303 and the side bars 202, 204 and 302, 304 occupy multiple planes. This configuration prevents mechanical interference between the two parallelogram four-bar linkages 200, 300 during rotation.

In preferred embodiments, the side bars 202, 204 and 302, 304 are substantially equal in length, and the coupler bars 203, 303 and the fixed bar 201 are also substantially equal in length. However, the lengths of the side bars 202, 204 and 302, 304 are less than the lengths of the coupler bars 203, 303 and the fixed bar 201. The lengths of the side bars 202, 204 and 302, 304, the coupler bars 203, 303 and the fixed bar 201 contribute to the wrist mechanism having unlimited rotatability. The lengths of the side bars 202, 204, 302, 304, the fixed bar 201 and the coupler bars 203, 303 are further described below with reference to FIG. 7.

In embodiments, the side bars 202, 204 are fixed out of phase with respect to the side bars 302, 304, respectively.

According to preferred embodiments, the side bars 202, 204 are fixed out of phase with respect to the side bars 302, 304, respectively, at approximately 60°. However, in embodiments, the side bars 202, 204 may be fixed out of phase with respect to the side bars 302, 304 at any desirable degree other than 0° according to a particular use of the invention. The out of phase relationship between the side bars prevents a transition to the anti-parallelogram configuration of FIG. 2a at the change point with respect to each parallelogram four-bar linkages 200, 300. Also, the out of phase relationship between the side bars 202, 204 and 302, 304 allows an end effector 207 to freely rotate 360° about the $\theta_5$ axis.

In preferred embodiments, the side bars 202, 204 are joined to the fixed bar 201 by pins 202a, 204a, respectively. Also, the side bars 202, 204 are joined to the coupler bar 203 by pins 202b, 204b, respectively. Similarly, in embodiments, the side bars 302, 304 are joined to the fixed bar 201 by the pins 202a, 204a, respectively, and the side bars 302, 304 are joined to the coupler bar 303 by pins 302b, 304b, respectively. Accordingly, in embodiments, the pin 202a fixes the side bar 202 to the side bar 302, and the pins 204a fixes the side bar 204 to the side bar 304. Hence, pins 202a, 204a may communicate through the fixed bar 201 and provide coupling support to the side bars 302, 304 and 202, 204, respectively, in the out of phase relation.

In embodiments, the side bars 302, 304 may be joined to the fixed bar 201 by the other pins (not shown), which are substantially similar to the pins 302a, 304a. However, the pins must maintain an out of phase relation between the side bars, as described above. In further embodiments, the pins are provided at the ends of the side bars 202, 204 and 302, 304, respectively. However, other placement locations of the pins are also contemplated for use by the present invention.

Figure 4:
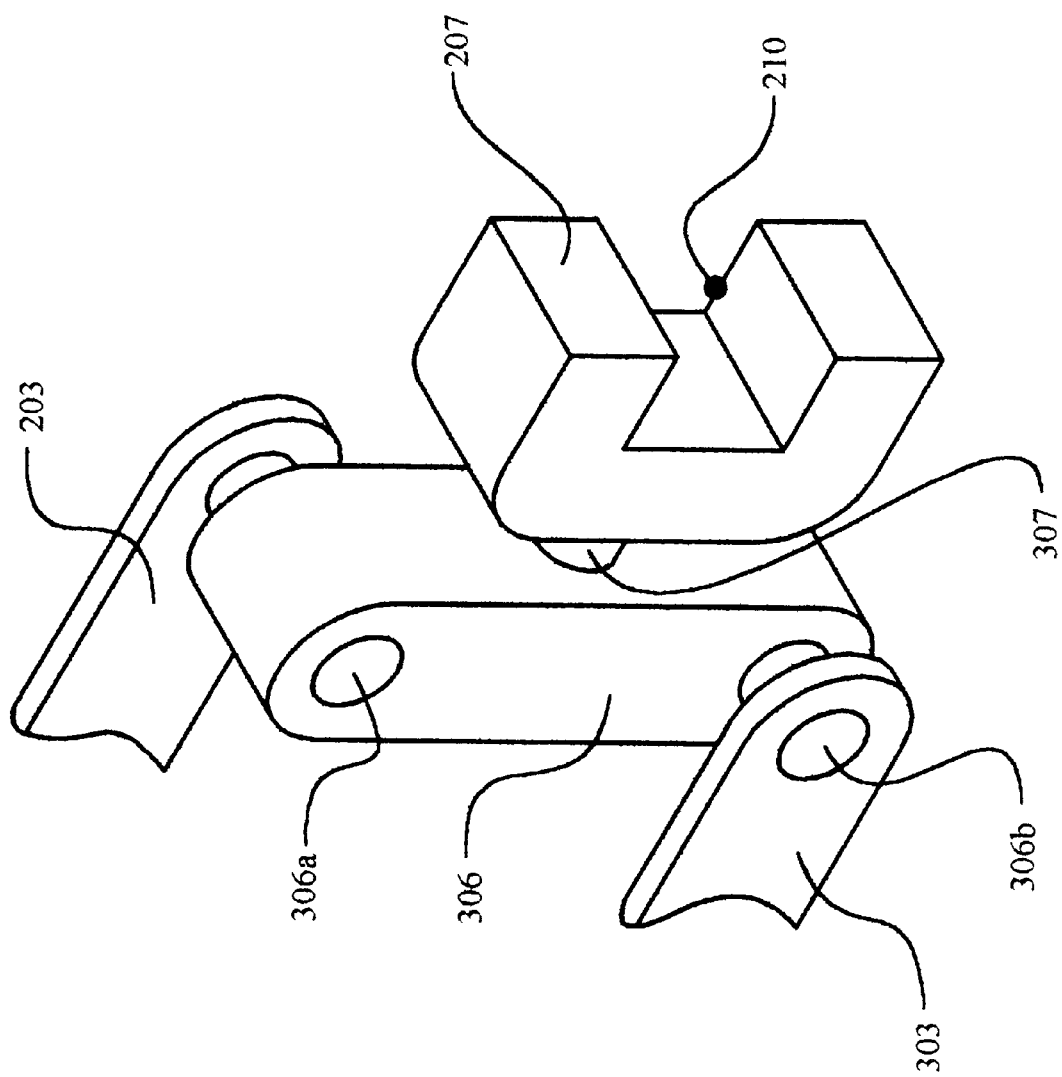
FIG. 4 shows coupler bars coupled to an end effector.

FIG. 4 shows coupler bars 203, 303 joined to a connector link 306 by pins 306a, 306b. The connector link 306 supports an end effector 207. In embodiments, the end effector 207 is capable of accessing any reachable point from any arbitrary direction with zero dwell time. Also, due to the configuration of the present wrist mechanism, particularly the manner in which the end effector 207 is support by both four-bar linkages 200, 300, the end effector 207 is capable of sustaining large loads, not envisioned by other wrist mechanisms. In embodiments, the end effector 207 may be a gripper tool, welding torch, spray gun, etc., or other well known end effector used in the art.

Figure 5:
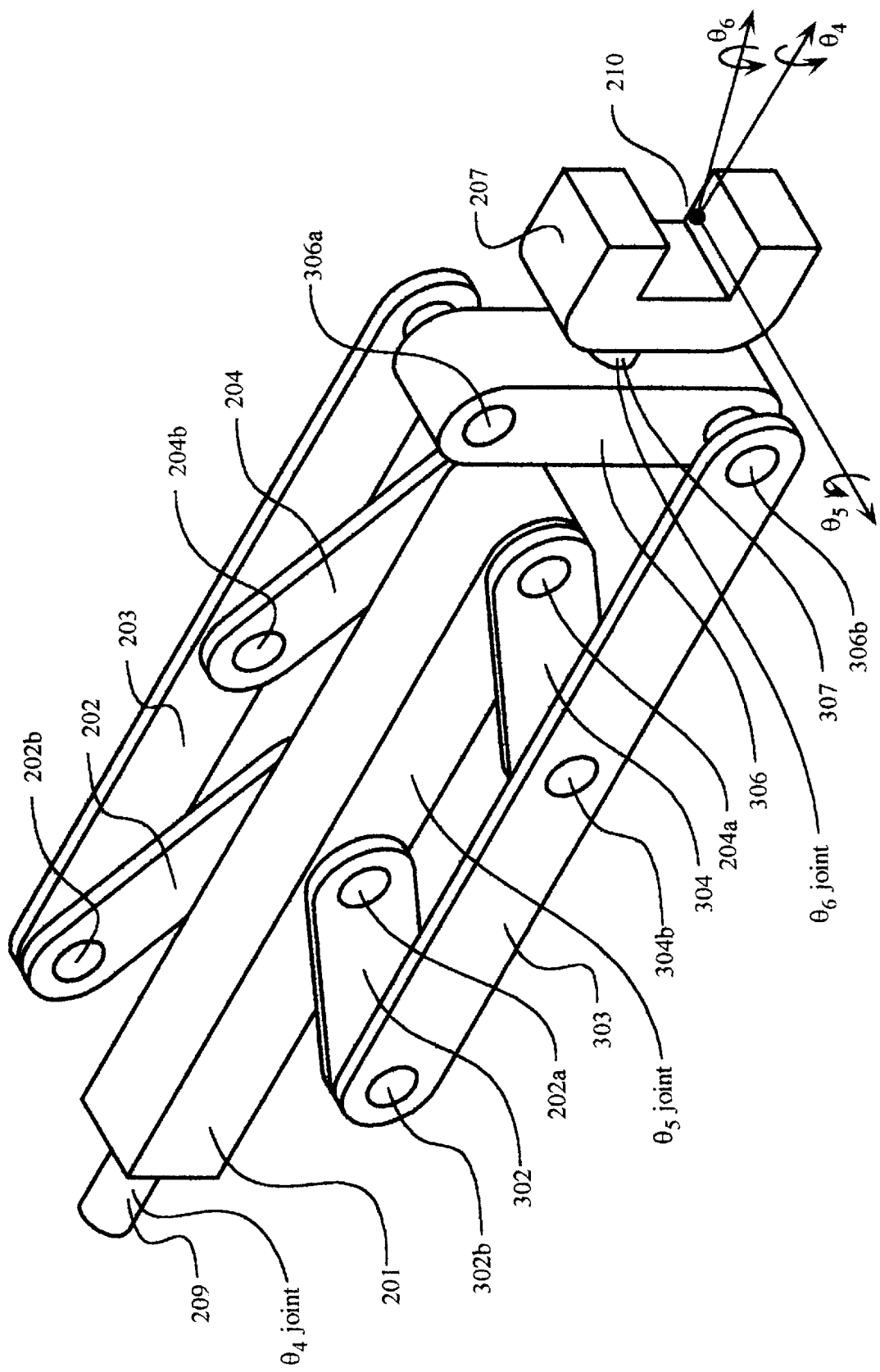
FIG. 5 shows the joints of the wrist mechanism.

FIG. 5 shows the joints of the wrist mechanism. The wrist mechanism comprises a $\theta_4$ joint, the $\theta_5$ joint and a $\theta_6$ joint. In preferred embodiments, the $\theta_4$, $\theta_5$, $\theta_6$ joints are revolute joints. The $\theta_4$ joint is associated with a pin 209 and the $\theta_6$ joint is associated with a pin 307 located between the end effector 207 and the connector link 306. As previously described, the $\theta_5$ joint (i.e., the intermediate joint) is associated with the (i) fixed bar 201, (ii) side bars 202, 204, 302 and 304, (iii) coupler bars 203, 303 and (iv) connector link 306. Accordingly, the $\theta_5$ joint comprises substantially the two parallelogram four-bar linkages 200, 300 operating in parallel.

Figure 6:
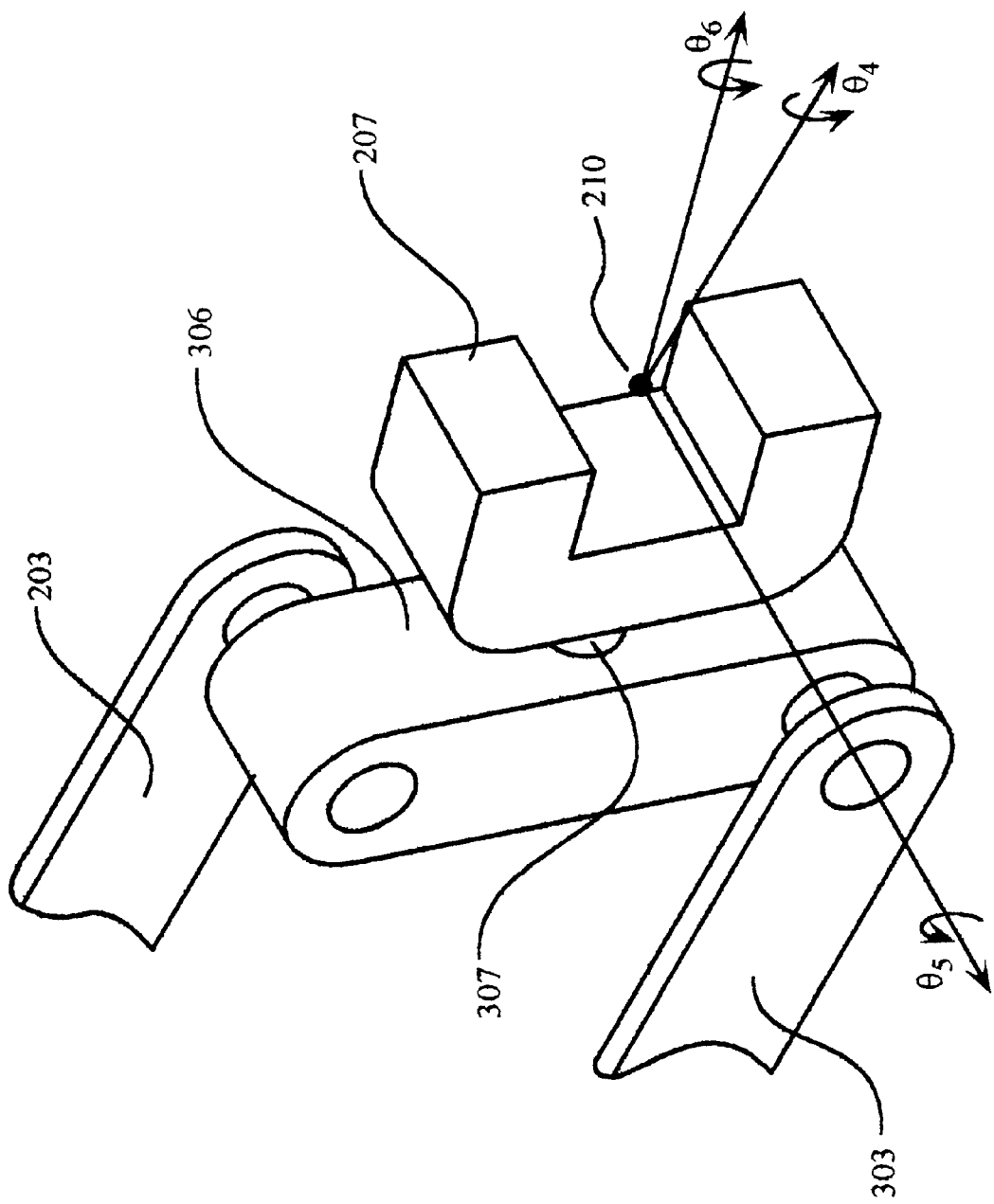
FIG. 6 shows a partial view of an end effector.

FIG. 6 shows a partial view of the end effector. As seen in FIG. 6, three mutually orthogonal axes $\theta_4$, $\theta_5$ and $\theta_6$ intersect at point 210 of the end effector 207. That is, the $\theta_4$ and $\theta_5$ axes are orthogonal with respect to one another, and similarly the $\theta_5$ and $\theta_6$ axes are orthogonal with respect to one another. Thus, the terminology "mutually orthogonal" axes refers to two axes being orthogonal with respect to one another. It is important to note that the $\theta_4$, $\theta_5$ and $\theta_6$ designations are meant for descriptive purposes and that other designations may equally be used herein. The $\theta_4$ axis shows a rotation of the wrist mechanism about the $\theta_4$ joint The $\theta_5$ axis shows a rotation of the wrist mechanism about the $\theta_5$ joint. The $\theta_6$ axis shows a rotation of the wrist mechanism about the $\theta_6$ joint. In other words, the $\theta_4$ joint rotates with respect to a regional structure (not shown) along the $\theta_4$ axis. The $\theta_5$ joint rotates with respect to the fixed bar 201 along the $\theta_5$ axis (and comprises substantially the two parallelogram four-bar linkages 200, 300 operating in parallel), and the $\theta_6$ joint rotates with respect to the intermediate joint 306 along the $\theta_6$ axis. As the wrist mechanism is rotated about the $\theta_5$ axis, the wrist mechanism rotates as seen in FIGS. 13(a)–13(l). The $\theta_4$, $\theta_5$, $\theta_6$ axes intersecting at the point 210 provide the basis for solving the decoupled and thus simplified inverse kinematics problem.

Figure 7:
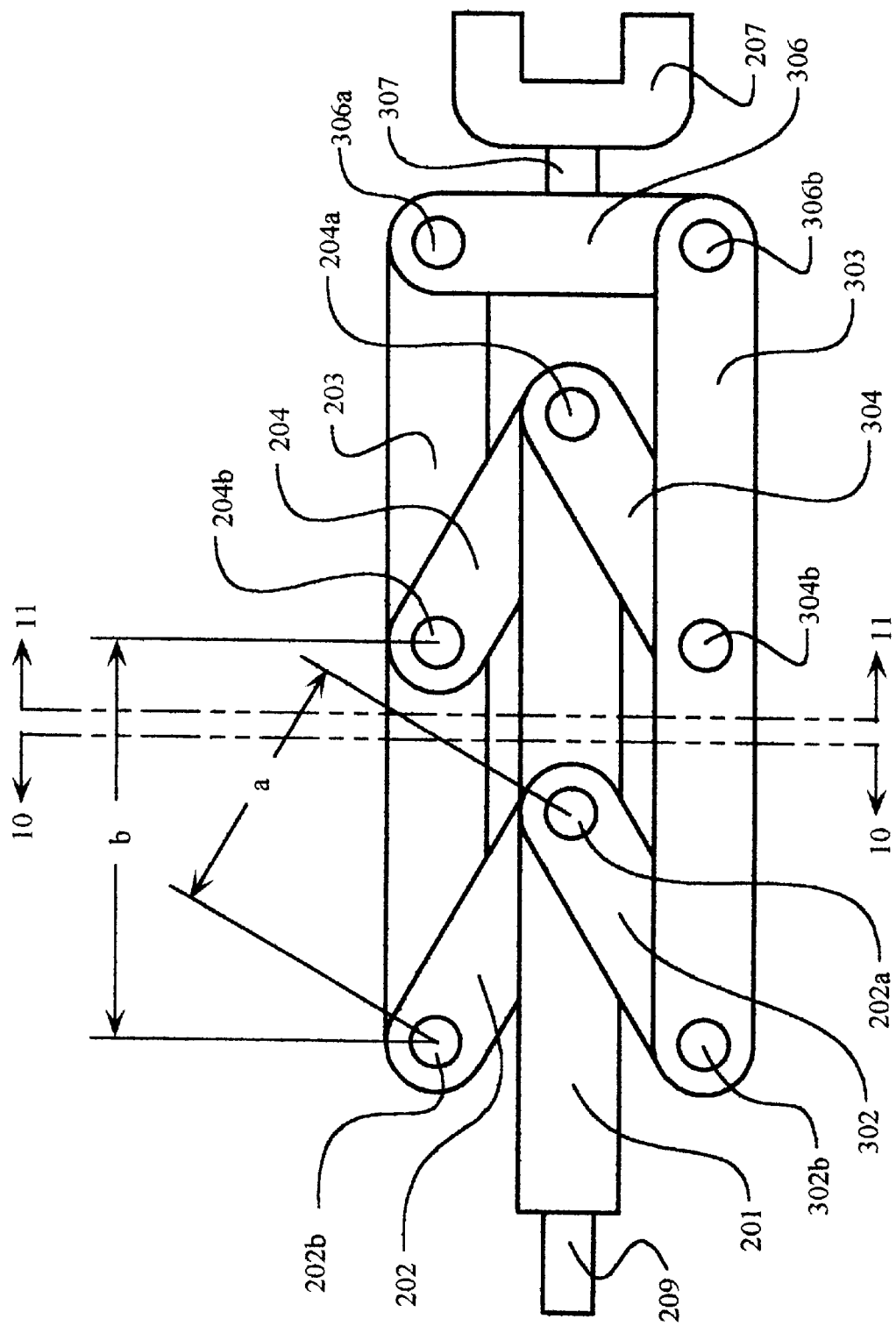
FIG. 7 shows a side view of the wrist mechanism.

FIG. 7 shows a side view of the wrist mechanism. In embodiments, the lengths of the side bars 202, 204 and 302, 304 are "a". The lengths of the coupler bars 203, 303 and the fixed bar 201 are "b". In embodiments, the length "a" and "b" may be arbitrary lengths provided that "a" is less than "b", which allows 360° of rotation for the four-bar linkages 200, 300.

As seen in FIG. 7, in embodiments, the spacing distance "b" between the pins 202a and 204a is also shown. In preferred embodiments, the spacing distance "b" is larger than the lengths "a" of the side bars 202, 204 and 302, 304. Also, the spacing distance "b" between the pins 202b, 204b is larger than the lengths "a" of the side bars 202, 204. Similarly, the spacing distance "b" between the pins 302b, 304b is larger than the lengths "a" of the side bars 302, 304. In preferred embodiments, the lengths "a" of the side bars 202, 204 are less than the lengths "b" of the fixed bar 201 and the coupler bar 203. Similarly, the lengths "a" of the side bars and 302, 304 are less than the lengths "b" of the fixed bar 201 and the coupler bar 303. This configuration further enables the end effector 207 to rotate 360° about an axis of the wrist mechanism with zero dwell time.

Figure 8:
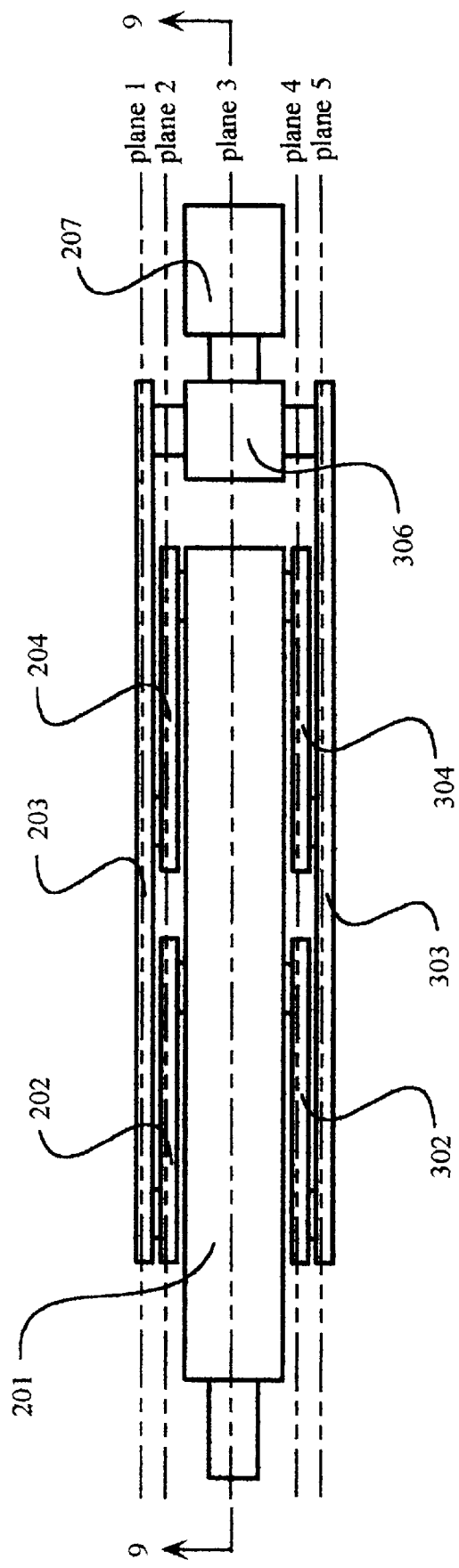
FIG. 8 show a top view of the wrist mechanism.

FIG. 8 shows a top view of the wrist mechanism. In preferred embodiments, the wrist mechanism occupies five planes. For example, (i) the coupler bar 203 occupies a first plane, (ii) the side bars 202, 204 occupy a second plane, (iii) the fixed bar 201 occupies a third plane, (iv) the side bars 302, 304 occupy a fourth plane, and (v) the coupler bar 303 occupies a fifth plane. In embodiments, the side bars 202, 204 may occupy separate planes, and the side bars 302, 304 may also occupy separate planes. However, the side bars 202, 204 may not occupy the same planes as the fixed bar 201 and/or the coupler bar 203. Likewise, on the other side of the fixed bar 201, the side bars 302, 304 may not occupy the same planes as fixed bar 201 and/or the coupler bar 303. In embodiments, the bars of the two parallelogram four-bar linkages 200, 300 are fixed out of phase with respect to each other so that a change point condition (of FIG. 2a) is not encountered. Clearly, by using this configuration, the present wrist mechanism may rotate a full 360° without stopping at $\theta_5=0°$, thus eliminating the dwell time problem. In embodiments, spacers may be placed between the linkages.

Figure 9:
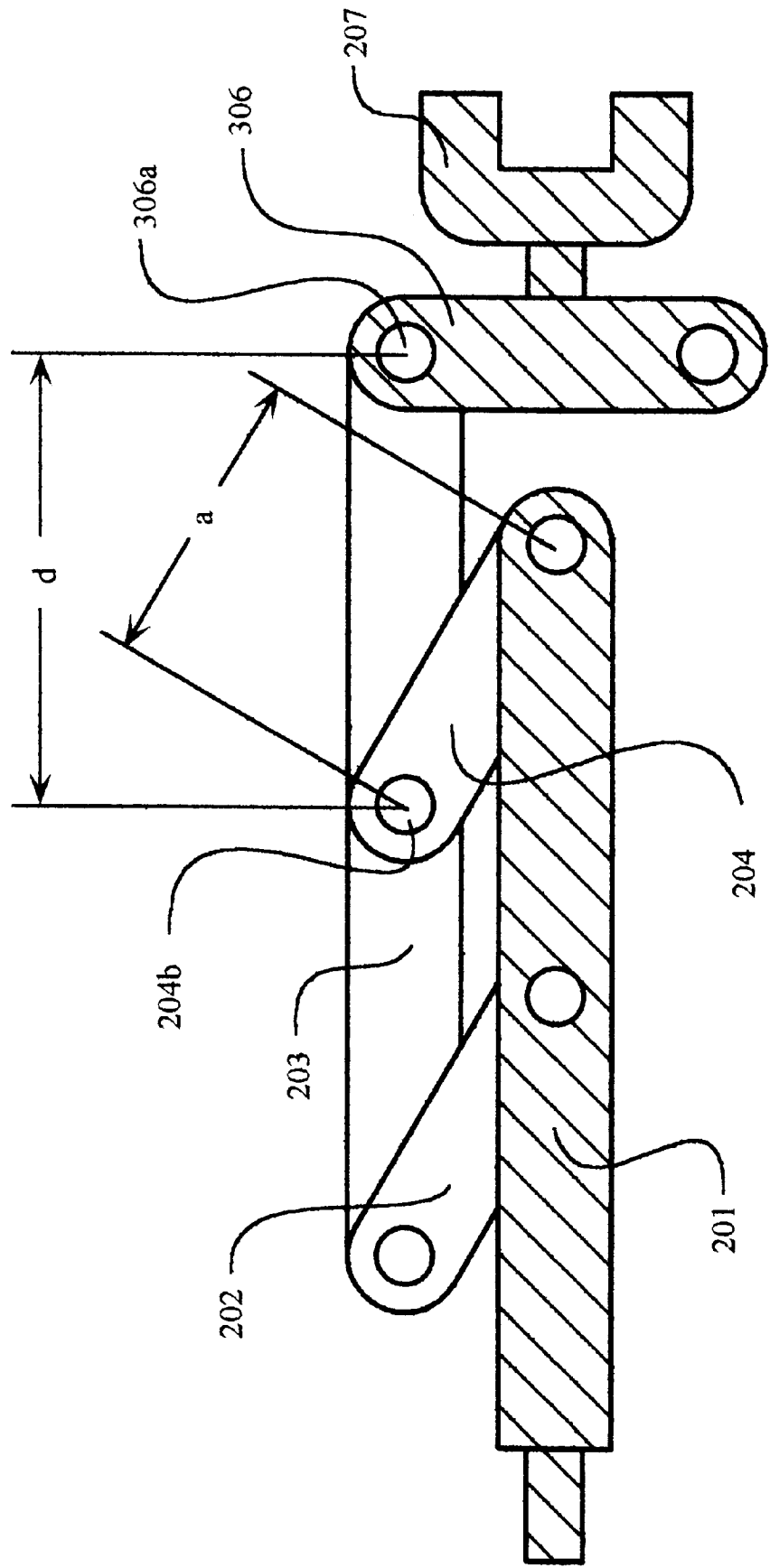
FIG. 9 shows a sectional view of the wrist mechanism along line 9—9 of FIG. 3.

FIG. 9 shows a sectional view of the invention along line 9—9 of FIG. 8. As seen in FIG. 9, in embodiments, the coupler bar 203 (and bar 303) extends past the pin 204b (and pin 304b), and supports the connector link 306. The coupler bar 203 (and bar 303) extends past the pin 204b at a distance "d" so that the end effector 207 may freely rotate about $\theta_5$ axis, as seen in FIGS. 13(a)–13(l), without any mechanical interference. In preferred embodiments, the distance "d" is greater than the distance "a" of the bar 204

Figure 10:
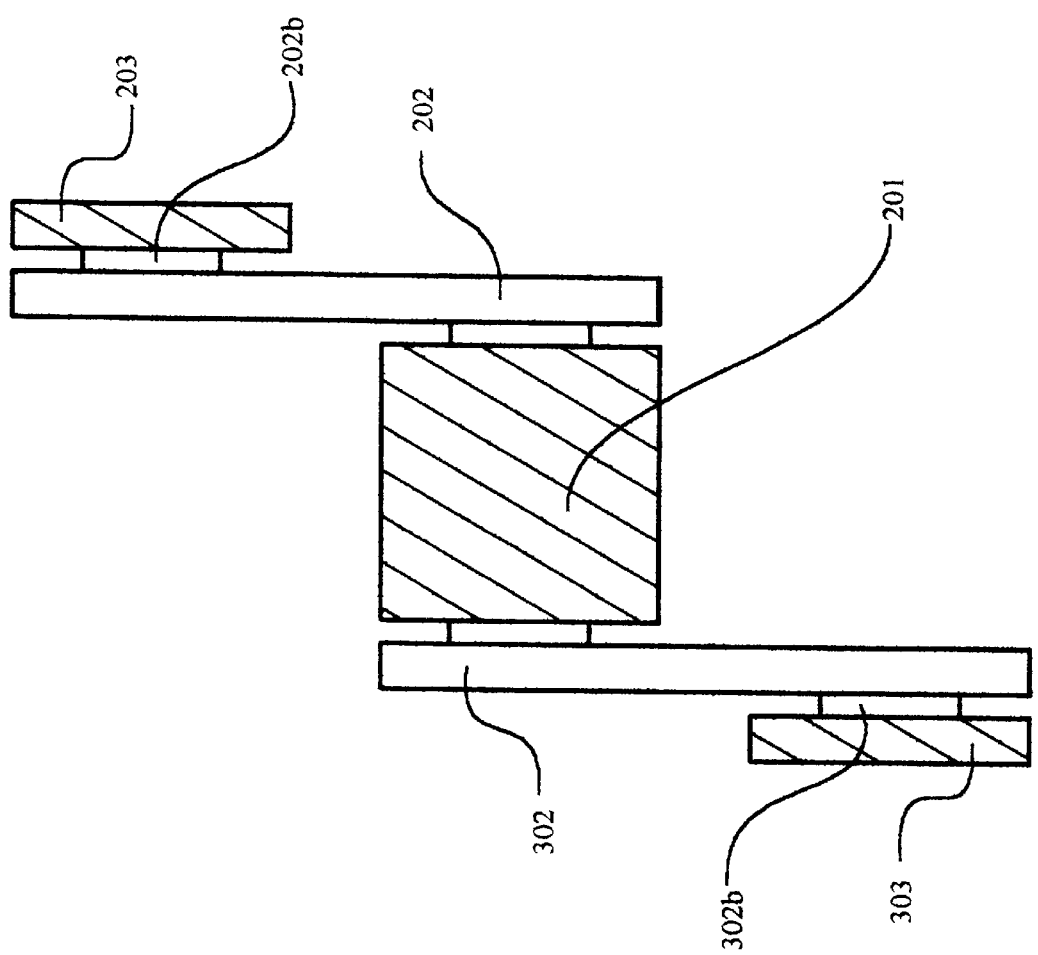
FIG. 10 shows a sectional view of the wrist mechanism along line 10—10 of FIG. 3.

FIG. 10 shows a sectional view of the invention along line 10—10 of FIG. 7. In embodiments, the ends of the side bars 202 and 302 are joined to the ends of the coupler bars 203 and 303, respectively, by pins 202b and 302b, respectively. In further embodiments, the coupler bars 203 and 303 may extend past the linkages 202b and 302b, respectively, and the fixed bar 201 extends past the pin 202a (not shown). In embodiments, a controller mechanism connects to the connector tip 209.

Figure 11:
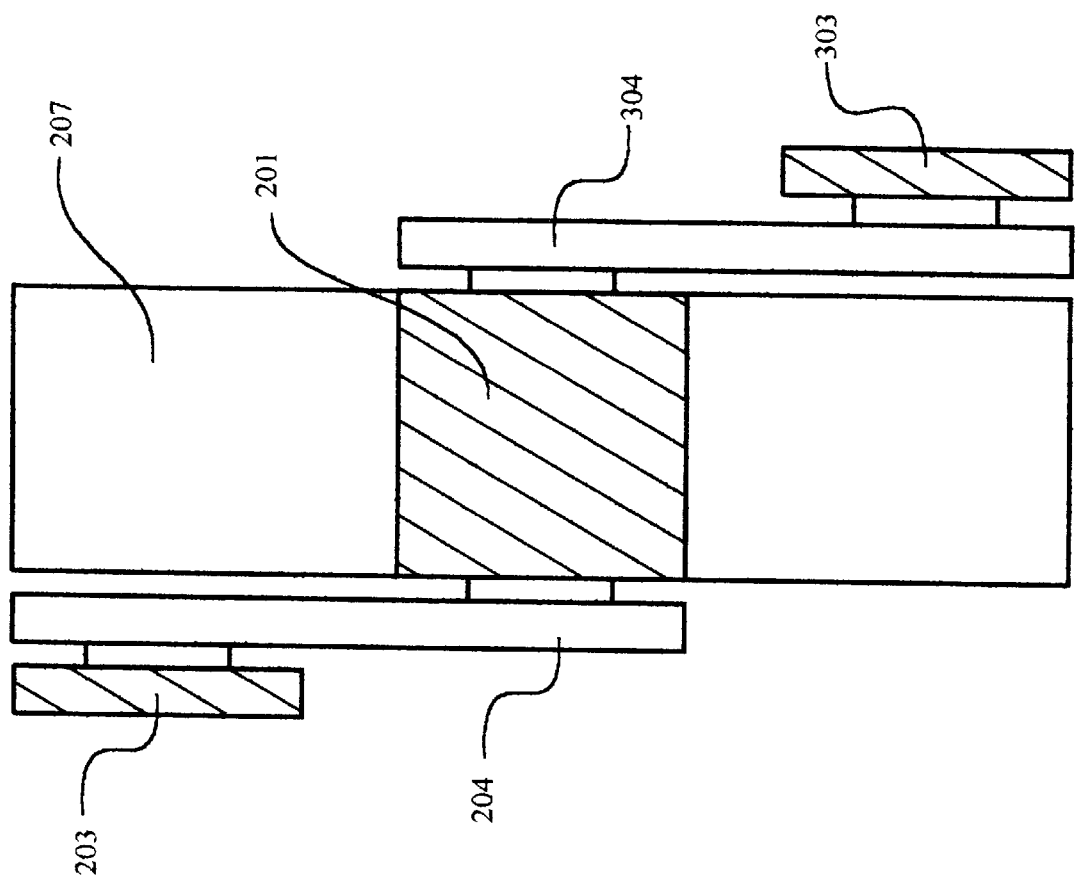
FIG. 11 shows a sectional view of the wrist mechanism along line 11—11 of FIG. 3.

FIG. 11 shows a sectional view of the invention along line 11—11 of FIG. 7. As seen in FIG. 11, in embodiments, the parallelogram four-bar linkage 300 occupies multiple planes which allows for unlimited rotation. In preferred embodiments, the fixed bar 201 lies in a plane offset by the side bar 304 (and side bar 302) and the coupler bar 303, respectively, as described with reference to FIG. 8. Similarly, the side bar 204 (and side bar 202) and the coupler bar 203 (positioned on the opposing side of the fixed bar 201) of the parallelogram four-bar linkage 200 also occupy multiple planes. As previously described, in embodiments, the side bars 202, 204 and 302, 304 may also occupy separate planes according to a particular use of the invention.

Figure 12:
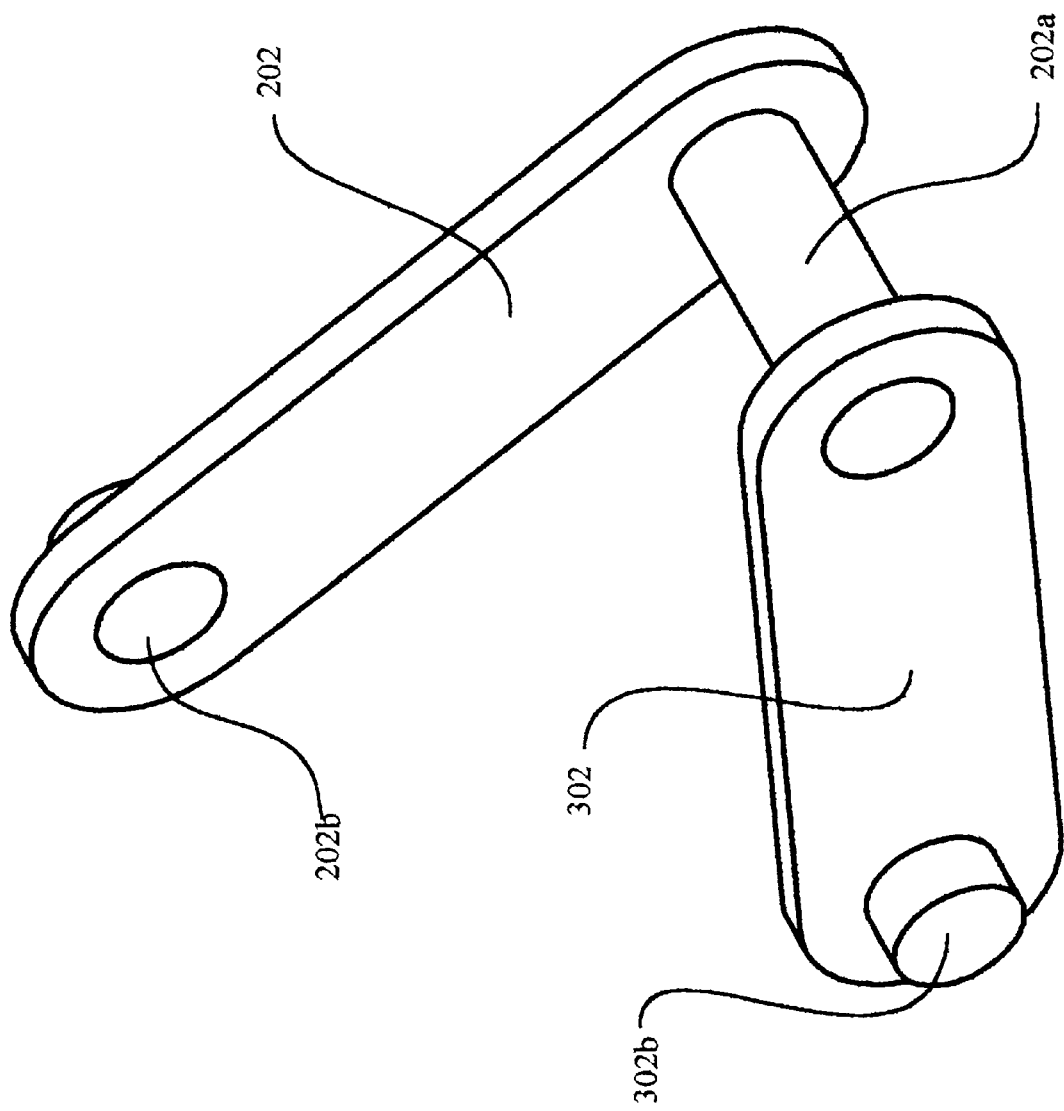
FIG. 12 shows the side bars of the wrist mechanism.

FIG. 12 shows a detailed view of the side bars 202, 302. To prevent a transition to the anti-parallelogram configuration of FIG. 2a, the two parallelogram four-bar linkages 200, 300 are fixed out of phase with respect to each other, preferably by pin 202a. Also seen in FIG. 12 are the pins 202b, 302b which are joined to the coupler bars 203, 303, respectively. The pins of the invention may comprise bearings, bushings, shafts, or other means well known in the art.

Figure 13A:
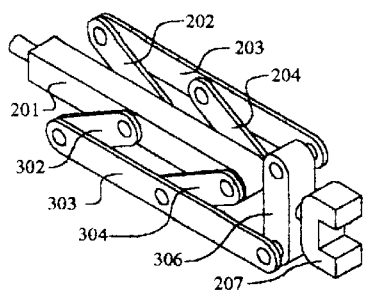
FIGS. 13(a)–13(l) show the invention with the intermediate joint (i.e., $\theta_5$) at various angles and the end effector being rotated about a $\theta_5$ axis.
Figure 13B:
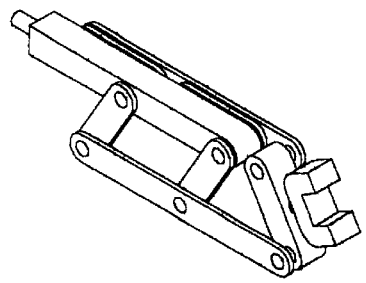
Figure 13C:
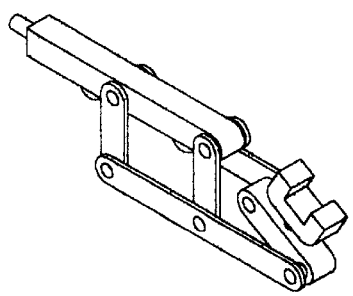
Figure 13D:
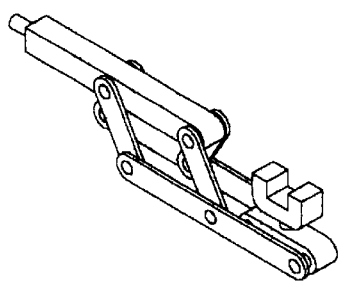
Figure 13E:
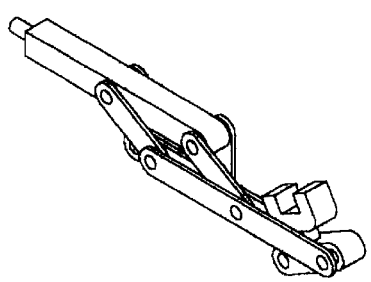
Figure 13F:
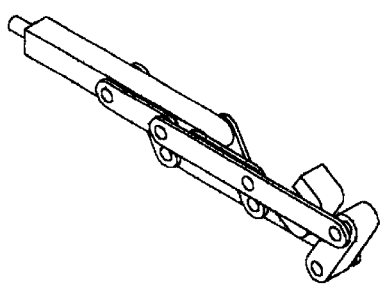
Figure 13G:
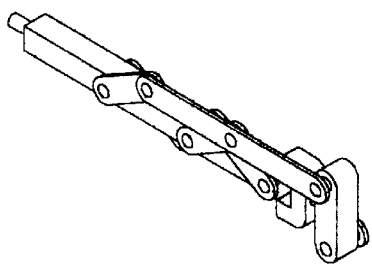
Figure 13H:
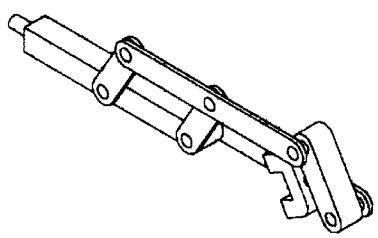
Figure 13I:
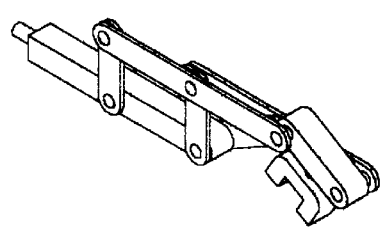
Figure 13J:
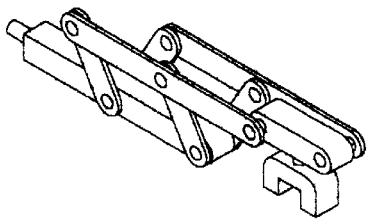
Figure 13K:
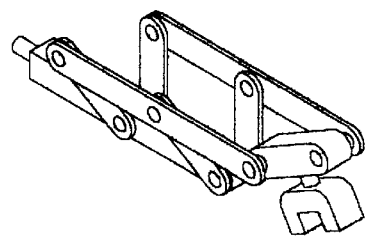
Figure 13L:
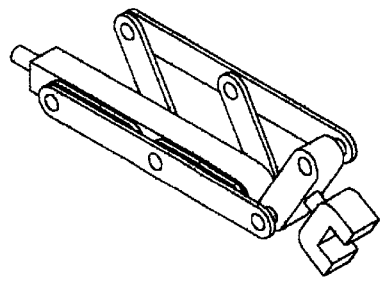

FIGS. 13(a)–13(l) show the end effector 207 being rotated about the $\theta_5$ axis. For example, (i) FIG. 13(a) shows the end effector 207 being rotated about the $\theta_5$ axis at 0° or 360°, (ii) FIG. 13(b) shows the end effector 207 being rotated about the $\theta_5$ axis at 30°, (iii) FIG. 13(c) shows the end effector 207 being rotated about the $\theta_5$ axis at 60°, (iv) FIG. 13(d) shows the end effector 207 being rotated about the $\theta_5$ axis at 90°, (v) FIG. 13(e) shows the end effector 207 being rotated about the $\theta_5$ axis at 120°, (vi) FIG. 13(f) shows the end effector 207 being rotated about the $\theta_5$ axis at 150°, (vii) FIG. 13(g) shows the end effector 207 being rotated about the $\theta_5$ axis at 180°, (viii) FIG. 13(h) shows the end effector 207 being rotated about the $\theta_5$ axis at 210°, (ix) FIG. 13(i) shows the end effector 207 being rotated about the $\theta_5$ axis at 240°, (x) FIG. 13(j) shows the end effector 207 being rotated about the $\theta_5$ axis at 270°, (xi) FIG. 13(k) shows the end effector 207 being rotated about the $\theta_5$ axis at 300°, and (xii) FIG. 13(l) shows the end effector 207 being rotated about the $\theta_5$ axis at 330°.

As further seen in FIGS. 13(a)–13(l), at any $\theta_5$ angle, the coupler bars 203, 303 and the fixed bar 201 remain parallel. Also, at any $\theta_5$ angle, the side bars 202, 204 remain parallel with respect to one another, and the side bars 302, 304 also remain parallel with respect to one another. Also, the side bars 202, 204 and the side bars 302, 304, respectively, remain fixed out of phase with respect to one another, as described above. Further, at any $\theta_5$ angle there is no mechanical interference between (i) the side bars 202, 204, 302, 304, (ii) the fixed bar 201, (iii) the end effector support 306 and (iv) the end effector 207. Accordingly, the wrist mechanism has zero dwell time throughout the range of 0° to 360°.

Although the wrist mechanism of the invention has unlimited rotatability and thus zero dwell time, only the range of $\theta_5 \approx \pm 120°$ (e.g. approximately 0°–120° and 240°–360°) may be usable due to interference by either the coupler bars 203 or 303, and a workpiece. However, as seen in FIGS. 13(a)–13(l), the $\theta_5$ joint has unlimited rotatability, e.g., 360°. Accordingly, the wrist mechanism has kinematically zero length with three mutually orthogonal unlimited joints allowing access to any reachable point from any arbitrary direction with zero dwell time.

It is well understood by those skilled in the art, that any motors, bearings, wiring, plumbing or other hardware may be used with the wrist mechanism of the present invention.

Preferred and alternative embodiments of the invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons of ordinary skill in the art.

What is claimed is:

1. A kinematically zero dimension wrist mechanism comprising:
   a first parallelogram four-bar linkage; and
   a second parallelogram four-bar linkage operating in parallel with the first parallelogram four-bar linkage, the first parallelogram four-bar linkage being fixed out of phase with respect to the second parallelogram four-bar linkage,
   thereby resulting in three unlimited joints whose axes intersect mutually orthogonally at a tool tip.

2. The wrist of claim 1, further comprising an end effector coupled to at least the first parallelogram four-bar linkage and the second parallelogram four-bar linkage.

3. The wrist of claim 2, wherein the end effector is a tool tip.

4. The wrist of claim 1, wherein the first parallelogram four-bar linkage and the second parallelogram four-bar linkage form three mutually orthogonal unlimited joints, the three mutually orthogonal unlimited joints including a first joint, an intermediate joint and an end effector joint.

5. The wrist of claim 4, wherein:
   the end joint resides at substantially an end of the wrist and is coupled to the first parallelogram four-bar linkage and the second parallelogram four-bar linkage,
   the end effector joint resides at substantially an end effector, the end effector being coupled to an opposing end with respect to the end joint of the first parallelogram four-bar linkage and the second parallelogram four-bar linkage, and
   the intermediate joint resides at substantially a juncture of the first parallelogram four-bar linkage and the second parallelogram four-bar linkage, the intermediate joint connects the end joint and the end effector joint and allows the effector to rotate freely about the end joint.

6. The wrist of claim 4, further comprising a first axis, an intermediate axis, and an end effector axis, the first axis, the intermediate axis and the end effector axis intersecting at a single point at the end effector.

7. The wrist of claim 6, wherein:
   the intermediate joint revolves around the intermediate axis,
   the first joint revolves around the first axis, and
   the end effector joint revolves around the end effector axis.

8. The wrist of claim 1, wherein:
the first parallelogram four-bar linkage comprises a fixed bar, a first coupler bar and first set of side bars, the first set of side bars coupling the fixed bar to the first coupler bar, and
the second parallelogram four-bar linkage comprises the fixed bar of the first parallelogram four-bar linkage, a second coupler bar, and second set of side bars, the second set of side bars coupling the fixed bar to the second coupler bar.

9. The wrist of claim 8, wherein:
the first set of side bars and the second set of side bars each occupy at least two planes, and
the first coupler bar and the second coupler bar each occupy at least two planes different from the two planes occupied by the first side bars and the second side bars.

10. The wrist of claim 8, wherein the first set of side bars and the second set of side bars occupy different planes from the fixed bar, the first coupler bar and the second coupler bar.

11. The wrist of claim 8, wherein the first set of side bars, the second set of side bars, the first coupler bar, the second coupler bar and the fixed bar each occupy different planes.

12. The wrist of claim 8, wherein:
the first set of side bars have kinematic lengths, the kinematic lengths of the first set of side bars are less than a kinematic length of the first coupler bar and the kinematic length of the fixed bar,
the second set of side bars have kinematic lengths, the kinematic lengths of the second set of side bars are less than a kinematic length of the second coupler bar and the kinematic length of the fixed bar, and
the kinematic lengths of the first set of side bars, the second set of side bars, the first coupler bar, the second coupler bar and the fixed bar allow unlimited rotatability of an end effector coupled to the first coupler bar and the second coupler bar.

13. The wrist of claim 8, wherein:
the first coupler bar, the second coupler bar and the fixed bar remain parallel with respect to one another at any rotational position, and
the first set of side bars remain parallel with respect to one another at any rotational position and
the second set of side bars remain parallel with respect to one another at any rotational position.

14. The wrist of claim 13, wherein:
a change point of the first set of side bars, the fixed bar and first coupler bar occurs without transmitting to an anti-parallel configuration, and
a change point of the second set of side bars, the fixed bar and the second coupler bar occurs without transmitting to an anti-parallel configuration.

15. The wrist of claim 8, wherein the set of first side bars are joined to one side of the fixed bar and the second set of side bars are joined to another side of the fixed bar.

16. The wrist of claim 8, wherein:
the first set of side bars are at least a first side bar and a second side bar, the first side bar being joined to the fixed bar by a first pin and the second side bar being joined to the fixed bar by a second pin, and
the second set of side bars are at least a third side bar and a fourth side bar, the third side bar being joined to the fixed bar by the first pin and the fourth side bar being joined to the fixed bar by the second pin.

17. The wrist of claim 16, wherein:
the first pin fixes the first side bar and the third side bar to each other in the out of phase relation with respect to one another, and the second pin fixes the second side bar and the fourth side bar to each other in the out of phase relation with respect to one another.

18. The wrist of claim 16, wherein a kinematic length between the first pin and the second pin is larger than at least one of (i) a kinematic length of the first side bar, (ii) a kinematic length of the second side bar, (iii) a kinematic length of the third side bar and (iv) a kinematic length of the fourth side bar.

19. The wrist of claim 16, wherein:
the first side bar is joined to the first coupler bar by a third pin,
the second side bar is joined to the first coupler bar by a fourth pin,
the third side bar is joined to the second coupler bar by a fifth pin, and
the fourth side bar being coupled to the second coupler bar by a sixth pin.

20. The wrist of claim 19, wherein:
a kinematic length between the third pin and the fourth is larger than at least one of (i) the kinematic length of the first side bar and (ii) the kinematic length of the second side bar, and
a kinematic length between the fifth pin and the sixth pin is larger than at least one (i) the kinematic length of the third side bar and (ii) the kinematic length of the fourth side bar.

21. The wrist of claim 8, further comprising a coupler link joining the first coupler bar and the second coupler bar to an end effector.

22. The wrist of claim 21, wherein the first coupler bar and the second coupler bar extend past the fourth pin and the sixth pin so that the end effector rotates freely without any mechanical interference.

23. The wrist of claim 22, wherein the kinematic length of extension of the first coupler bar and the second coupler bar is greater than the kinematic lengths of the second side bar and the fourth side bar.

24. A kinematically zero dimension wrist mechanism comprising:
end effector holding means for holding an end effector;
first pivoting means for pivotally supporting the end effector holding means at one end; and
second pivoting means for pivotally supporting the end effector holding means at another end, wherein
the first pivoting means and the second pivoting means are in an out of phase relation with respect to one another and are connected to one another by a common linkage bar,
the first pivoting means and the second pivoting means rotate the end effector from a starting position about an axis and extend 360 degrees from the starting position,
the first pivoting means and the second pivoting means are arranged relative to each other to permit movement of the end effector without any mechanical interference during the 360 degrees of movement.

25. The wrist mechanism of claim 24, wherein the first pivoting means and the second pivoting means occupy different planes.

26. The wrist mechanism of claim 24, wherein:
the first pivoting means includes a first side bar, a second side bar, a fixed bar and a coupler bar,
the second pivoting means includes a third side bar, a fourth side bar, the fixed bar and a second coupler bar, the first side bar and second side bar being joined to one side of the fixed bar, and the third side bar and the fourth side bar being fixed to another side of the fixed bar, the first side bar and third side bar being joined out of phase with respect to one another, and the second side bar and the fourth side bar being fixed out of phase with respect to one another, wherein the fixed bar is the common linkage bar linking the first parallelogram four-bar linkage with the second parallelogram four-bar linkage.

27. The wrist mechanism of claim 26, wherein:

the first side bar and second side bar occupy at least one plane, the third side bar and the fourth side bar occupy at least one plane or planes different from the first side bar, and the side second bar, the fixed bar occupies one plane different from the planes of the first side bar, the side second bar, the third side bar, and the side fourth bar, the first coupler bar and the second coupler bar occupy separate planes different from the fixed side bar, the first side bar, the second side bar, the third side bar and the fourth side bar.

28. The wrist of claim 26, wherein:

the first side bar is joined to the fixed bar by a first pin and the second side bar is joined to the fixed bar by a second pin, and the third side bar is joined to the fixed bar by the first pin and the fourth side bar is joined to the fixed bar by the second pin.

29. The wrist of claim 28, wherein a kinematic length between the first pin and the second pin is larger than at least one of (i) a kinematic length of the first side bar, (ii) a kinematic length of the second side bar, (iii) a kinematic length of the third side bar and (iv) a kinematic length of the fourth side bar.

30. The wrist of claim 28, wherein:

the first side bar is joined to the first coupler bar by a third pin, the second side bar is joined to the first coupler bar by a fourth pin, the third side bar is joined to the second coupler bar by a fifth pin, and the fourth side bar is joined to the second coupler bar by a sixth pin.

31. The wrist of claim 30, wherein:

a kinematic length between the third pin and the fourth pin is larger than at least one of (i) the kinematic length of the first side bar and (ii) the kinematic length of the second side bar, and a kinematic length between the fifth pin and the sixth pin is larger than at least one (i) the kinematic length of the third side bar and (ii) the kinematic length of the fourth side bar.

32. A kinematically zero dimension wrist mechanism comprising:

a first four bar linkage system having a first side bar, a second side bar, a fixed bar and a first coupler bar;

a second four bar linkage system having a third side bar, a fourth side bar, the fixed bar and a second coupler bar; and an end effector having a first end and a second opposing end and joined to both the first four bar linkage system and the second four bar linkage system, wherein the first coupler bar is pivotally connected approximately about the first end of the end effector and second coupler bar is pivotally connected approximately about the second end of the end effector, the first side bar and third side bar are joined through the fixed bar in an out of phase relation with respect to one another, the second side bar and the fourth side bar are joined through the fixed bar in an out of phase relation with respect to one another, the first side bar and the second side bar are substantially parallel with respect to one another at any rotation, the third side bar and the fourth side bar are substantially parallel with respect to one another at any rotation, the first coupler bar, the second coupler bar and the fixed bar are substantially parallel with respect to one another at any rotation, and one of the first side bar and the second side bar, one of the third side bar and fourth side bar, the fixed bar, the first coupler bar and the second coupler bar occupy different planes.

33. The wrist of claim 32, wherein a kinematic length of the first bar, the second bar, the third bar and fourth bar are less than a kinematic length of the first coupler bar, the second coupler bar and the fixed bar.

34. The wrist of claim 32, wherein:

a kinematic length between a first pin which joins the first side bar and the third side bar to the fixed bar, and a second pin which joins the second bar and the fourth bar to the fixed bar is larger than at least one of (i) a kinematic length of the first side bar, (ii) a kinematic length of the second side bar, (iii) a kinematic length of the third-side bar and (iv) a kinematic length of the fourth side bar, a kinematic length between a first coupler pin which joins the first side bar to the first coupler bar, and a second coupler pin which joins the side second bar to the first coupler bar is larger than at least one of (i) the kinematic length of the first side bar and (ii) the kinematic length of the second side bar, and a kinematic length between a third coupler pin which joins the third side bar to the second coupler bar and a fourth coupler pin which joins the fourth side bar to the second coupler bar is larger than at least one (i) the kinematic length of the third side bar and (ii) the kinematic length of the fourth side.

35. A kinematically zero dimension wrist mechanism comprising:

a first parallelogram four-bar linkage;

a second parallelogram four-bar linkage operating in parallel with the first parallelogram four-bar linkage, the first parallelogram four-bar linkage being fixed out of phase with respect to the second parallelogram four-bar linkage, a connector link rotatably attached to the first and second parallelogram four-bar linkage, and a pin associated with the first and second parallelogram four-bar linkage at an opposing end to the connector link, thereby providing three degrees of unlimited rotation about a point on a tool tip.

* * * * *